PHOTOELECTRIC AND THERMOELECTRIC DEVICE
UTILIZING SEMICONDUCTING MATERIAL
Filed May 9, 1950

Inventors
KARL LARK-HOROVITZ,
SEYMOUR BENZER &
ROBERT E. DAVIS
BY Morris R. Rabkin
Attorney Patented Mar. 4, 1952 2,588,254

UNITED STATES PATENT OFFICE 2,588,254

PHOTOELECTRIC AND THERMOELECTRIC DEVICE UTILIZING SEMICONDUCTING MATERIAL

Karl Lark-Horovitz, La Fayette, Ind., Seymour Benzer, Pasadena, Calif., and Robert E. Davis, East McKeesport, Pa., assignors to Purdue Research Foundation, La Fayette, Ind., a corporation of Indiana Application May 9, 1950, Serial No. 161,002

10 Claims. (Cl. 136—89)

Figure 1:
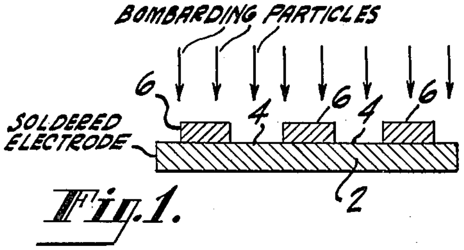

This invention relates generally to photoelectric and thermoelectric devices and, more particularly, to improved devices comprising a body of semiconducting material having regions of N-type conductivity and regions of P-type conductivity separated by high resistance barrier layers.

It has previously been known that, when extremely pure germanium is melted and is then permitted to cool slowly, a part of the melt crystallizes such that it exhibits N-type conduction. That is, it conducts by the presence of negative (electron) carriers in the conduction band. Another part of the solidified melt will exhibit P-type conduction; that is, conduction by means of "holes" in the valency band. Thus, acceptors produce positively charged carriers. In this type of conduction, electrons are kept moving in one direction. The so-called "holes" appear to be moving in the opposite direction. Between the region of N-type conduction and the region of P-type conduction is a transition region in the nature of a barrier layer, having high resistance rectifying properties.

When the semiconducting material is prepared as above described, the transition region between the N-type germanium and the P-type germanium is vaguely defined and is usually irregular. Because of this, even though it has been known that the P–N barrier region exhibits photovoltaic and thermoelectric properties, the crystallized germanium, prepared by carefully controlled melting and cooling, has not been practical for commercial use in apparatus utilizing these properties.

It has also been found previously, however, that bodies of germanium could be prepared in another manner with both N-type and P-type regions and sharply defined high resistance regions between the N-type and the P-type material. This other method is that described in co-pending application, Serial No. 67,198, filed December 24, 1948. The method is also described in an article by Karl Lark-Horovitz entitled "Conductivity in Semiconductors," Electrical Engineering, 68, 12, December, 1949, pages 1047–1056. The method referred to includes bombarding N-type germanium of high purity with charged nucleons. These nucleons may be charged particles such as alpha particles, deuterons, or protons. The bombarding particles must possess high energy; for example, of the order of some m. e. v., and they may be generated by means of a cyclotron or other well known means for producing these high voltage nuclear particles. Another convenient source of alpha particles is radioactive material.

In the above referred to co-pending application, there was also disclosed one method of forming a plurality of regions of N-type material alternating with regions of P-type material when using charged nucleons. This was done by shielding parts of the surface of a body of the N-type germanium with a material such as lead, which does not transmit charged nucleons, while leaving other areas unshielded. The entire surface was then exposed to a stream of the charged particles.

If the shielded areas are in the form of parallel stripes across the width of the surface, the resulting product will be in striated form. N-type regions alternate with P-type, and have sharply defined P–N high resistance barriers between.

An important aspect of the present invention relates to a novel photoresponsive and thermoresponsive device utilizing a body of germanium having a plurality of alternating regions of N-type and P-type characteristics such as made by the method described in the referred to co-pending application. Another aspect of the invention is the provision of an improved method of preparing the striated material having a plurality of N-type regions and a plurality of P-type regions.

One object of the present invention is to provide an improved photovoltaic cell.

Another object of the invention is to provide a photovoltaic cell capable of relatively high output voltages.

Another object of the present invention is to provide an improved device for converting light energy into electrical energy.

Another object of the invention is to provide an improved photovoltaic device comprising a unitary body of a semiconducting material.

Another object of the invention is to provide an improved method of producing a plurality of regions of N-type characteristics alternating with regions of P-type characteristics in a body of germanium semiconducting material.

Another object of the invention is to provide an improved method of producing a plurality of P–N high resistance barrier layers in a unitary body of germanium semiconducting material.

Another object is to provide an improved body of germanium semiconducting material having a plurality of P–N high resistance barrier layers.

Another object is to provide an improved thermoelectric cell.

Still another object is to provide a thermoelectric cell capable of relatively high output voltages.

Figure 2:
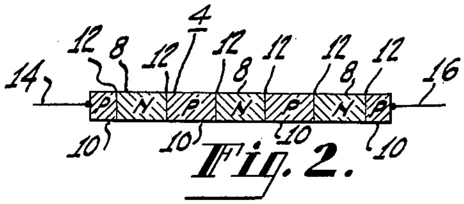
Figure 3:
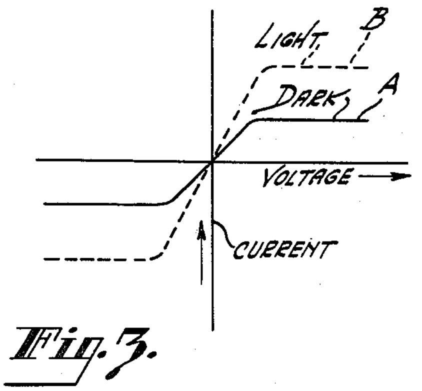
Figure 4:
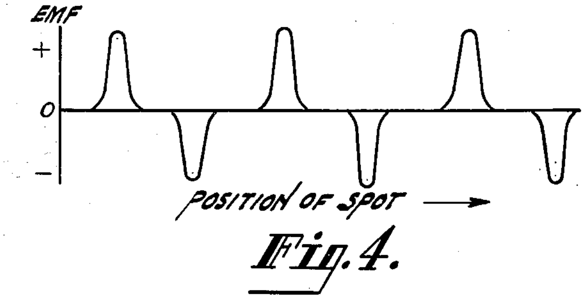
Figure 5:
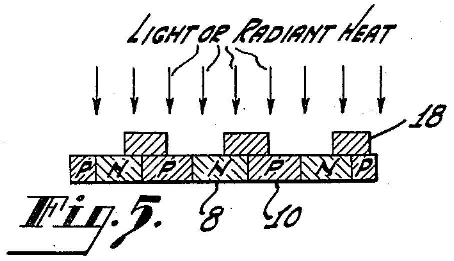
Figure 6:
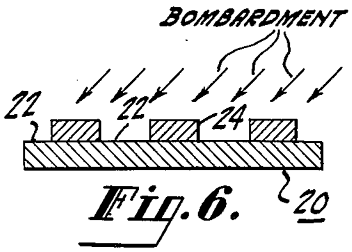
Figure 7:
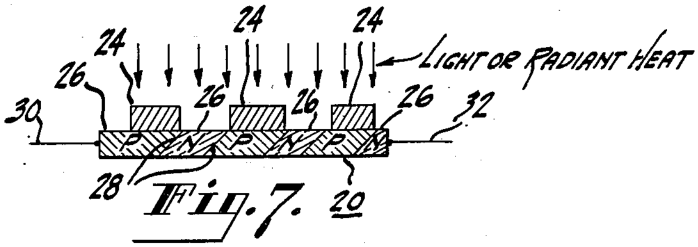

These and other objects will be more apparent and the invention will be more readily understood from the following description including the illustrative drawings, of which:

Figure 1 is a diagrammatic illustration, in cross section, of one method of preparation of a body of germanium semiconducting material having alternating N-type and P-type regions, Figure 2 is a diagrammatic illustration of a cross section of a body of germanium prepared by the method illustrated in Figure 1, Figure 3 is a graph showing the contrast between dark current characteristic and light characteristic with variations in voltage when an entire face of a unit, such as illustrated in Figure 2, is illuminated, Figure 4 is a graph showing how photo-E. M. F. output varies when a small spot of light is moved from end to end across the face of a unit such as illustrated in Figure 2, Figure 5 is an illustration, in cross section, of an improved device utilizing the body illustrated in Figure 2, Figure 6 is a diagrammatic illustration of an improved method of preparing a semiconducting body such as utilized in the present invention, and Figure 7 is a diagrammatic illustration, in cross section, of a device including a body such as that made by the method illustrated in Figure 6.

Referring now to Figure 1, a thin piece of N-type germanium 2; (i. e., thin enough to be transparent to the bombarding particles used), has at least one surface ground substantially flat. There is then positioned on one of these surfaces 4 a plurality of strips of material 6 suitable for absorbing charged nucleons. These strips may be of lead, palladium, gold, etc. The entire surface is then bombarded with charged nucleons in the manner described in the previously referred to co-pending application, Serial No. 67,198. The bombarding particles may be caused to strike the surface 4 at about a 90° angle.

The article which results from this method of treatment is illustrated in cross section in Figure 2. The original body of N-type germanium has been converted into a striated product in which N-type regions 8 alternate with P-type regions 10 with high resistance barriers 12 between the two types of regions. All of this has previously been disclosed in the said co-pending application of Karl Lark-Horovitz and is repeated here for purposes of illustration, only.

A pair of leads 14 and 16 may be soldered to the ends of the body prepared as described above. When a beam of light is directed to the entire surface 4 of the body, a potential is generated. Referring to Figure 3, first, with no light applied, the dark characteristic of the unit exhibits saturation for both directions of applied voltage (curve A). Each half of the characteristic represents the sum of the inverse resistances of one member of each pair of P–N interfaces. Illumination of the entire surface of the device produces the characteristic illustrated in curve B of Figure 3. Illumination of only one of the interfaces 12 gives a change in only one of the halves of the characteristic.

If a small spot of either light or radiant heat is moved along the surface 4 of the unit and the E. M. F. across the terminals of the leads 14 and 16 is observed, a curve of E. M. F. is obtained, such as illustrated in Figure 4. In this curve, voltage peaks alternate between positive and negative values. From this, it can be seen that, upon uniform illumination of the entire unit, the resultant E. M. F. is quite small.

A semiconducting body having a plurality of P–N interfaces, such as illustrated in Figure 2, may, however, be modified so that the E. M. F. obtained from the entire unit is the sum of the individual E. M. F.'s, produced by each P–N interface. In accordance with the present invention, it has been found that, if every other P–N interface is shielded from light (or heat), the E. M. F.'s of one polarity add up. Referring to Figure 5, a germanium body comprising alternate N-type regions 8 and P-type regions 10, such as shown in Figure 2, is provided with light shielding members 18, which cover alternate P–N interfaces but leave the remainder of the interfaces unshielded. The shielding members may comprise the original shielding members used to shield alternate strips of the material from the charged nucleons. The members may merely be moved slightly from their original position so as to shield the interfaces produced by the bombardment. Other shielding means may be used, however, since any material opaque to light may be used. Preferably, the shielding member should not conduct heat very well, either. Instead of using movable shielding members, it is also possible to apply narrow stripes of an opaque pigment so as to cover the interfaces and prevent light from striking them.

A further improvement, both in method of preparing the striated germanium material and in the resulting product, is illustrated in Figures 6 and 7. Starting with a slab 20 of N-type germanium, a surface 22 of the body is provided with shielding members 24 of the same type as specified in the previous example. That is, the members are of any material that is opaque to charged nucleons. The shielding members are also positioned, as in the previous example, so as to cover parallel strips of the surface but leaving unshielded strips 26 between the members and at the ends of the body. The surface is then bombarded with a stream of charged nucleons just as disclosed in the previously referred to co-pending application, Serial No. 67,198, with but one modification being made. Instead of bombarding such that the charged nucleons strike the surface of the material at an angle of about 90°, the surface of the material is turned with respect to the direction of bombardment such that the angle is substantially different from 90°, say 45°. This angle does not appear to be critical. The resulting product is, then, a body such as illustrated in Figure 7, in which the P–N interfaces 28 are not perpendicular to the major surfaces of the body but are at the same angle thereto as the bombardment angle. This type of body has several advantages over the type having all P–N interfaces at an angle of about 90° to the major surfaces. The body can be provided with soldered leads 30 and 32 and, without moving the shielding members 24, the unit can be used as a photovoltaic cell or as a thermoelectric cell, since every other P–N interface will already be shielded from light or heat. The reason that this is advantageous is that it is difficult to locate the P–N interfaces exactly after the striated body has been prepared. This is particularly the case if the shielding members are removed without marking the surface in some manner. The interfaces can be located again either by electrolytic etching or by running a probe over the surface and measuring the photo-E. M. F. of thermal-E. M. F. If a piece is prepared with hundreds of boundaries very closely spaced, the problem can become extremely difficult.

The greatest photovoltaic E. M. F. that can be generated by a single P–N interface is approximately the width of the so-called "forbidden band" of the semiconductor, since, if an E. M. F. of that magnitude is built up, the potential gradient becomes zero. For germanium, the width is of the order of 0.7 volt. By constructing a cell comprising 100 P–N interfaces, for example, the limiting photo-E. M. F. can be as high as about 70 volts.

The efficiency of the device is affected by the spacing of the interfaces and the thickness of the germanium. It has been found that light or radiant heat, falling in the regions where no potential gradient exists, produces no effect. Therefore, the thickness of the P–N interface, which is governed by the impurity and lattice defect densities, should be made as large a part of the spacing as possible. As an example, the thickness of the P–N interface may be of the order of $10^{-5}$ cm. Using a grating replica as a shield, it is possible to produce a body having thousands of barriers per cm. Very sensitive thermopiles can be constructed by blackening alternate barriers.

The thickness of the germanium body may vary considerably, it being necessary only to use a body which is thin enough to permit the charged nucleons to pass entirely through. Experimental units have been made in which the germanium was ground down to a thickness of 0.15 mm. or less and this was bombarded with 20 m. e. v. alpha particles.

We claim as our invention:

1. A device comprising a unitary body of germanium having a plurality of alternating regions of N-type and P-type characteristics and means connecting said regions in series aiding relationship.

2. A device comprising a body of germanium having ends between which are a plurality of alternating regions of N-type and P-type characteristics with high resistance barrier layers at each N–P interface, and means shielding every other one of said barrier layers from radiant energy.

3. A device according to claim 2 including electrodes on said ends.

4. Apparatus comprising a body of germanium having ends between which are a plurality of alternating regions of N-type and P-type characteristics with high resistance barrier layers at each N–P interface, means shielding every other one of said barrier layers from radiant energy, and a source of radiant energy positioned to direct said energy on the unshielded ones of said barrier layers.

5. A device comprising a relatively thin, elongated unitary body of germanium semiconducting material, said body comprising a plurality of N-type regions alternating with P-type regions, said regions extending completely through and across said body, high resistance barrier layers at each N–P interface, and means shielding every other one of said barrier layers from radiant energy.

6. A photovoltaic cell comprising a unitary body of germanium semiconducting material, said body comprising a plurality of N-type regions alternating with P-type regions, said regions extending completely through and across said body, P-type regions at the ends of said body, and electrodes on said end regions.

7. A photovoltaic cell comprising a unitary body of germanium semiconducting material in the form of a relatively thin slab, said body comprising a plurality of N-type regions alternating with P-type regions, said regions extending completely through said slab between the faces of said slab and at an angle thereto other than 90°.

8. A radiant energy responsive cell comprising a unitary body of germanium semiconducting material in the form of a relatively thin slab, said body comprising a plurality of N-type regions alternating with P-type regions, high resistance barrier layers at each N–P interface, said barrier layers extending between the faces of said slab at angles thereto which are substantially different from 90°.

9. A cell according to claim 8 including means effectively shielding alternate ones of said barrier layers from radiant energy.

10. A method of producing a body of germanium semiconducting material having a plurality of N-type regions alternating with P-type regions, comprising bombarding with high voltage charged nucleons a relatively thin slab of N-type germanium material, said slab having alternate parallel strips of one of its surfaces shielded against penetration of said nucleons and the remainder unshielded therefrom, the direction of said bombardment being at an angle to said surface substantially different from 90°.

KARL LARK-HORVITZ.
SEYMOUR BENZER.
ROBERT E. DAVIS.

REFERENCES CITED

The following references are of record in the file of this patent:

UNITED STATES PATENTS

| Number | Name | Date |
|---|---|---|
| 2,504,627 | Benzer | Apr. 18, 1950 |